Sept. 7, 1954   R. MENNESSON   2,688,192
APPARATUS FOR MEASURING THE DIFFERENCES BETWEEN
DIAMETERS OF A CROSS SECTION OF A PIECE, AND IN
PARTICULAR OF A PIECE THAT IS BEING MACHINED
Filed Sept. 1, 1953

INVENTOR
ROBERT MENNESSON
BY
Bailey, Stephens + Huettig
ATTORNEYS

Patented Sept. 7, 1954

2,688,192

UNITED STATES PATENT OFFICE 2,688,192

APPARATUS FOR MEASURING THE DIFFERENCES BETWEEN DIAMETERS OF A CROSS SECTION OF A PIECE, AND IN PARTICULAR OF A PIECE THAT IS BEING MACHINED

Robert Mennesson, Neuilly-sur-Seine, France, assignor to Societe d'Applications et de Constructions Pour Materiel Automobile (S. A. C. M. A.), Neuilly-sur-Seine, France Application September 1, 1953, Serial No. 377,905

Claims priority, application France December 6, 1952

7 Claims. (Cl. 33—147)

1

The present invention relates to apparatus for measuring or checking the differences between different diameters of a cross section of a piece. This invention is more essentially but not exclusively concerned with apparatus for measuring these differences on a piece that is being machined.

It occurs frequently, when a piece which is to be theoretically of revolution about an axis is being machined, that the cross sections of this piece are slightly different from the theoretical cross sections. This is in particular what occurs in the case of pieces of relatively small cross section with respect to their length, or in the case of badly balanced pieces or again of pieces mounted between two points the centering of which is defective.

At the present time, it is usual to employ, in order to measure pieces that are being machined, gauges which include two contacts located substantially along the same diameter of the piece, and the variations of distance between these two contacts are measured by means of an amplifier which may be a mechanical amplifier, a pneumatic one, an electric one, etc. These amplifiers may, in some cases, give an indication concerning a possible lack of roundness of the piece. However, they do not make it possible to know the value of this defect by direct reading. For instance, in the case of mechanical amplifiers, use is generally made of a pointer movable in front of a dial and the value of the lack of roundness may be known by appreciating the amplitude of displacement of the pointer during the rotation of the piece. In the case of pneumatic amplifiers, the inertia of such amplifiers is generally so high that it does not make it possible to appreciate the above mentioned defect.

The object of the present invention is to obviate these drawbacks and to make it possible to determine, by direct reading on a graduated scale or on a dial, the exact value of the lack of roundness, that is to say of the difference between the maximum and minimum diameters of a given cross section.

It should be well understood that the apparatus according to my invention is applicable not only to the example above stated but also to all kinds of measurements of transverse dimensions of pieces in which there is an alternation, for instance to measurement of other defects than ovalization (for instance triangulation), of the eccentricity of two bores, of two external diameters, of a bore and of an external diameter,

2 or to the measurement of variations of transverse dimensions of a piece which is to be made eccentric.

My apparatus for determining the amplitude of relative reciprocating movements of two feelers movable with respect to each other and in contact with a rotating piece at points diametrally opposed with respect to the axis of rotation thereof is characterized in that a circular member, interposed between two parts respectively connected with said feelers, is mounted to roll without slipping with respect to two surfaces belonging to said two parts respectively and only as far as a predetermined position with respect to at least one of said surfaces owing to the provision of abutment means for said member carried by the part to which said last mentioned surface belongs, an amplifier device carried by said last mentioned part indicating the amplitude of the reciprocating movements of said member from said position with respect to said part.

Preferred embodiments of my invention will be hereinafter described with reference to the accompanying drawings, given merely by way of example, and in which.

Figure 2:
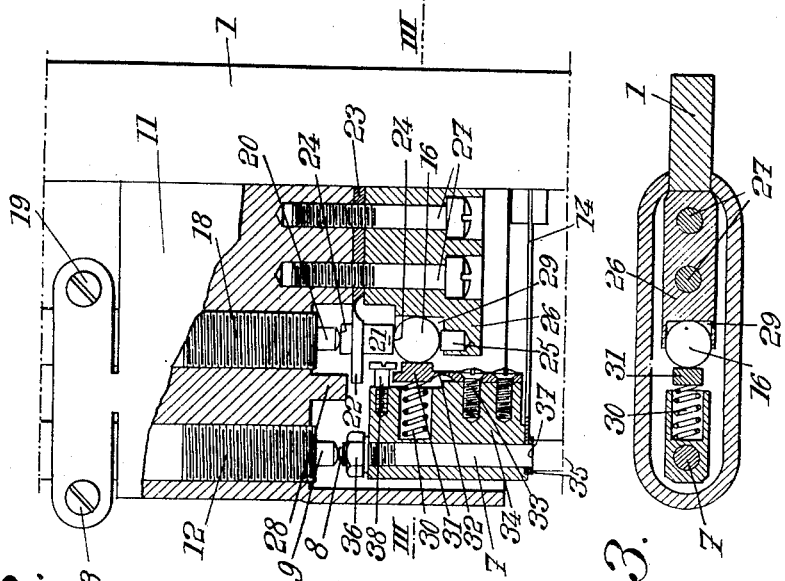
Fig. 2 is an enlarged view partly in section of a portion of the apparatus shown in Fig. 1.
Figure 3:
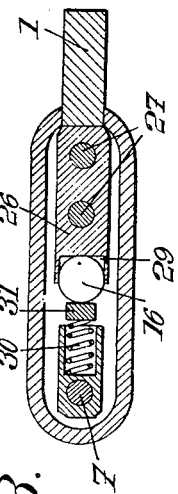
Fig. 3 is a sectional view on the line III—III of Fig. 2.

The general structure of the apparatus may be of any suitable kind whatever. For instance, as shown by the drawings, the apparatus includes a frame 1 in which a support 2 is fixed, for instance by means of screws not visible on the drawing, this support 2 including a measurement feeler 3, which may be adjustable, and an abutment 4. Frame 1 is fixed to the machine-tool with which my apparatus is to cooperate, this fixation being effected through suitable means diagrammatically illustrated on the drawing by a spindle 5, such means constantly urging feeler 3 and abutment 4 against the piece A which is being machined. Diametrically opposed to feeler 3 with respect to piece A, there is provided a feeler 6 mounted at the end of a rod 7, the other end of this rod carrying a contact 8 which is to operate the rod 9 of an amplifier 10 mounted in a support 11 fixed to frame 1 by means of screws which are not shown in the drawing. Amplifier 10 is adjustable in support 11 by means of screw-threads 12 which are caught and immobilized by tightening a screw 13. Rod 7 is held by means of two flexible plates 14 one end of each of these plates being fixed to frame 1 and the other end being fixed to rod 7. A protection member 15 is provided to prevent shocks on the flexible plates 14 and on rod 7.

According to my invention, I interpose between two surfaces which are respectively rigid one with feeler 3 and the other with feeler 6, a member capable on the one hand of rolling without sliding simultaneously on both of these surfaces due to the relative displacements thereof and, on the other hand, of sliding on one and/or on the other surface when it comes into contact with an abutment rigid with one of said surfaces. Advantageously, this element is constituted by a ball or a roller, at least one of said surfaces being in the form of a kind of gutter or trough. The surfaces are substantially parallel to the displacement of rod 7 and elastic means are provided for urging both of these surfaces toward each other and consequently toward the rolling element.

I will now give a more detailed description of the embodiments illustrated by the drawings.

The rolling element is constituted by a ball 16 the displacements of which are measured by a second amplifier 17 carried by support 11 and adjustable in position in this support by means of screw-threads 18, a fixation device constituted by screw 19 being provided to keep the amplifier in the desired position in its support. The displacements of ball 16 are transmitted to the rod 20 of amplifier 17 through a push-piece 21 carried by the free end 22 of a flexible metal strip 23, this push-piece 21 carrying two parallel plane contacts 24.

The vertical displacements of ball 16 are limited by an abutment 25 mounted in a member 26 fixed in support 11 by means of two screws 27. The flexible plate 23 is fixed between member 26 and support 11 by means of the above mentioned screws 27. An abutment 28, integral with support 11, is provided to limit the displacements of the free end 22 of flexible plate 23. The lateral displacements of ball 16 (that is to say the displacements thereof in a direction at right angles to the plane of Fig. 2) are limited by giving the portion 29 of member 26 the shape of a gutter (or possibly that of a V). Ball 16 is urged toward the bottom of gutter 29 by a spring 30 acting through the free end 31 of a flexible plate 32 fixed by means of two screws 33 in a support 34 rigid with rod 7. This support 34 is provided with a small recess 35 in which the lower flexible plate 14 is partly engaged so that support 34 cannot rotate with respect to said flexible plate. Support 34 is tightly applied against a shoulder 37 of rod 7 by means of a nut 36. An abutment, constituted for instance by a screw 38, limits the displacements of the free end 31 of flexible plate 32 when this last mentioned plate is not in contact with ball 16 (for instance when the apparatus is taken to pieces).

This apparatus works as follows.

When measurement feelers 3 and 6 are displaced with respect to each other, they cause support 34 to be moved with respect to support 26. As the flexible plate 32 has its free end 31 applied against ball 16, such a relative displacement causes this ball 16 to run in its gutter 29 as far as this rolling displacement is not prevented by contact with abutment 25 or abutment 28.

Before performing a measurement, ball 16 is to be applied upon abutment 25 when feelers 3 and 6 are themselves applied against the ends of a diameter of piece A. This condition is easily fulfilled by lifting support 34 or a part rigid therewith (for instance feeler 6), sufficiently beyond the position for which the end 22 of flexible plate 23 is in contact with abutment 28. The vertical displacement of ball 16 in its gutter 29 is then stopped and one is sure that, when support 34 is released until feeler 6 comes to apply against piece A, ball 16 preliminarily comes onto its abutment 25 and remains applied upon this abutment during the end of the displacement of support 34.

In the example which relates to the measurement of the differences between the different external diameters of a piece A, ball 16 remains constantly applied against its abutment 25 until feelers 3 and 6 are at a distance corresponding to the minimum diameter of piece A. Then, during the rotation of said piece A, the distance to be measured increases from this minimum value, support 34 is lifted with respect to support 26 and causes ball 16 to roll in its gutter 29, this displacement of ball 16 corresponding, with a given reduction, to the difference between the maximum and minimum diameters of the cross section of piece A. The above mentioned reduction is due to the fact that the true displacement of feelers 3 and 6 with respect to each other is imparted to the end 31 of plate 32 with respect to support 26, but the displacement of the center of ball 16 (which displacement is that measured by amplifier 17) is equal to one-half of the displacement of part 31 with respect to part 26.

Let it be supposed that piece A is not being machined and that this piece is not truly circular in section and is being rotated about its axis. Ball 16 will run in its gutter 29 between two positions the distance between which is equal, on the example shown, to one-half of the relative displacement of feelers 3 and 6, and this will correspond to an oscillation of the rod 20 of amplifier 17 between two positions.

If, as above explained, the apparatus is adjusted in such manner that when measurement feelers 3 and 6 are applied along the minimum diameter of piece A, ball 16 is in contact with abutment 25 and if, for this position of the ball, amplifier 17 is adjusted so that it indicates zero on its scale, it is clear that, during the rotation of piece A, ball 16 will move between a lower position corresponding to its contact with abutment 25 and an upper position which depends upon the difference between the maximum and the minimum diameters of piece A.

Figure 1:
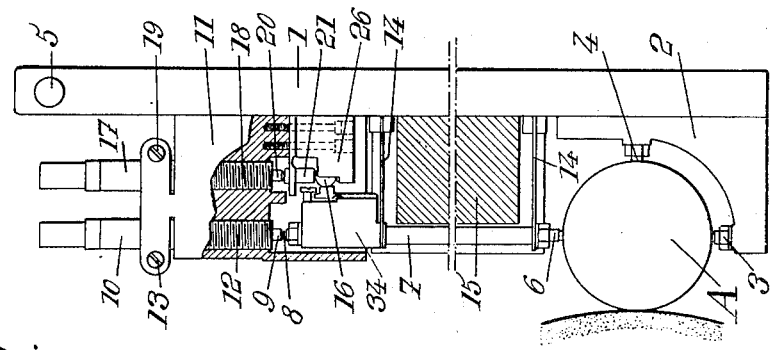
Fig. 1 is a side view with parts in section of an apparatus made according to my invention.

Amplifier 17 may be provided with a damping device, for instance of the kind of that described in French patent No. 983,614, and shown in Fig. 1 of this patent. In this case, the measurement read on this amplifier will indicate the mean value of the upward displacement of ball 16 from its position of contact with abutment 25. As above explained, the upward displacement of ball 16 is equal to one half of the difference between the maximum and minimum diameters of piece A and amplifier 17, which gives the mean value of this upward displacement, consequently indicates one fourth of this difference. The scale of this amplifier is therefore accordingly graduated. When ball 16 rolls in a V-shaped groove instead of rolling in a gutter such as 29, the ratio between this displacement and those of parts 31 and 26 is different, and it depends upon the angle of the V-shaped groove. If piece A is perfectly round, ball 16 remains in contact with abutment 25 and amplifier 17 indicates zero.

If now it is supposed that piece A is being machined, that is to say that the mean diameter of this piece is constantly being reduced by the machining operation, the apparatus will work as follows:

Ball 16 is applied against its abutment 25 for any position whatever of piece A. The reductions of diameter of said piece due to machining will tend to apply ball 16 against abutment 25. But, when feelers 3 and 6, after they have passed along the line of the minimum diameter, keep moving along the periphery of piece A, the distance between said feelers 3 and 6 increases and ball 16 is caused to move away from abutment 25. Therefore, whatever be the variations of the mean diameter of piece A in the course of its machining, the device constantly indicates the difference between its maximum and minimum diameters.

If piece A were subjected to some treatment, for instance a metal depositing, tending constantly to increase its diameter, the operation would be the same by inverting the position of abutment 25 with respect to the direction of displacement of ball 16 and to that of the pieces which measure the displacement of said ball.

Of course, the embodiment above described is given merely by way of example, and the present invention is not in any way limited thereto. In particular, it should be well understood that elements 26 and 34 which carry the surfaces along which ball 16 (or any circular member) is rolling are rigidly connected to the feelers 3 and 6 respectively. Elements 26 and 34 might be connected to feelers 3 and 6 respectively in such manner that to relative displacements of feelers 3 and 6 with respect to each other, there corresponds a given displacement of elements 26 and 34 with respect to each other. For instance, the displacements of members 26 and 34 with respect to each other might be of greater amplitude than the corresponding displacements of feelers 3 and 6. On the other hand, although the provision of the ball such as 16 between the parallel surfaces of members 31 and 26 is a preferred construction, it should be well understood that I might provide other arrangements. It suffices to have a circular member rolling on one of said surfaces.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for determining the amplitude of relative reciprocating movements of two feelers movable with respect to each other which comprises, in combination, two parts respectively connected with said feelers to reciprocate with respect to each other in accordance with the relative reciprocating displacements of said feelers, said parts having respective surfaces located opposite each other, means for resiliently urging at least one of said parts toward the other in a direction transverse to said surfaces, a circular member interposed between said surfaces in rolling engagement with one of them and operatively connected with the other one to roll without slipping with respect thereto, abutment means carried by the part to which said second mentioned surface belongs for stopping said member to limit the movements thereof in one direction to a predetermined position with respect to said second mentioned surface, and amplifier means carried by said last mentioned part for indicating the amplitude of the reciprocating movements of said member from said position with respect to said last mentioned part.

2. An apparatus for determining the amplitude of relative reciprocating movements of two feelers movable with respect to each other which comprises, in combination, two parts respectively connected with said feelers to reciprocate with respect to each other in accordance with the relative reciprocating displacements of said feelers, said parts having respective surfaces located opposite each other, means for resiliently urging at least one of said parts toward the other in a direction transverse to said surfaces, a circular member interposed between said surfaces in permanently unimpeded rolling engagement with one of them and operatively connected with the other one to roll without slipping with respect thereto only as long as the center of said member is able to move along a line parallel to said second mentioned surface, abutment means carried by the part to which said second mentioned surface belongs for stopping said member to limit the movements in one direction of the center of said member along said line to a predetermined position with respect to said second mentioned surface, and amplifier means carried by said last mentioned part for indicating the amplitude of the reciprocating movements of said member from said position with respect to said last mentioned part.

3. An apparatus for determining the amplitude of relative reciprocating movements of two feelers movable along a given line with respect to each other which comprises, in combination, two parts carried by said feelers having respective surfaces parallel to said line located opposite each other, means for resiliently urging at least one of said parts toward the other in a direction transverse to said surfaces, a circular member interposed between said surfaces in permanently unimpeded rolling engagement with one of them and operatively connected with the other one to roll without slipping with respect thereto only as long as the center of said member is able to move along a line parallel to said second mentioned surface, abutment means carried by the part to which said second mentioned surface belongs for stopping said member to limit the movements in one direction of the center of said member along said last mentioned line to a predetermined position with respect to said second mentioned surface, and amplifier means carried by said last mentioned part for indicating the amplitude of the reciprocating movements of said member from said position with respect to said last mentioned part.

4. An apparatus for determining the amplitude of relative reciprocating movements of two feelers movable along a straight line with respect to each other which comprises, in combination, two parts carried by said feelers having respective rectilinear surfaces parallel to said line located opposite each other, means for resiliently urging at least one of said parts toward the other in a direction transverse to said surfaces, a circular member interposed between said surfaces in permanently unimpeded rolling engagement with one of them and operatively connected with the other one to roll without slipping with repect thereto only as long as the center of said member is able to move along a line parallel to said second mentioned surface, abutment means carried by the part to which said second mentioned surface belongs for stopping said member to limit the movements in one direction of the center of said member along said last mentioned line to a predetermined position with respect to said second mentioned surface, and amplifier means carried by said last mentioned part for indicating the amplitude of the reciprocating movements of said member from said position with respect to said last mentioned part.

5. An apparatus for determining the amplitude of relative reciprocating movements of two feelers movable along a given line with respect to each other which comprises, in combination, two parts respectively connected with said feelers to reciprocate with respect to each other in accordance with the relative reciprocating displacements of said feelers, said parts having respective surfaces parallel to said line located opposite each other, means for resiliently urging at least one of said parts toward the other in a direction transverse to said surfaces, a ball interposed between said surfaces in contact with both of them in permanently unimpeded rolling engagement with one of them, abutment means carried by the part to which the other surface belongs for stopping said ball to limit the movements thereof in one direction to a predetermined position with respect to said second mentioned surface, and amplifier means carried by said last mentioned part for indicating the amplitude of the reciprocating movements of said member from said position with respect to said last mentioned part.

6. An apparatus according to claim 5 in which said abutment means consist of a projection carried by the part to which belong the second mentioned surface and extending transversely to said second mentioned surface.

7. An apparatus for determining the amplitude of relative reciprocating movements of two feelers movable along a given line with respect to each other which comprises, in combination, two structures rigid with said feelers respectively, a resilient strip having one end thereof fixed to one of said structures, the other end of said strip and the other structure having respective surfaces parallel to said line located opposite each other, spring means interposed between said strip and said first mentioned structure for urging said strip toward said surface of the other structure, a ball interposed between said surfaces and in contact with both of them in permanent unimpeded rolling engagement with one of them, abutment means carried by the second mentioned structure for stopping said ball to limit the movements thereof in one direction to a predetermined position with respect to said second mentioned surface, and amplifier means carried by said last mentioned part for indicating the amplitude of the reciprocating movements of said member from said position with respect to said last mentioned part.

No references cited.